US010123051B2

(12) United States Patent
Laganiere et al.

(10) Patent No.: US 10,123,051 B2
(45) Date of Patent: *Nov. 6, 2018

(54) VIDEO ANALYTICS WITH PRE-PROCESSING AT THE SOURCE END

(71) Applicant: iwatchLife, Inc., Ottawa (CA)

(72) Inventors: Robert Laganiere, Gatineau (CA); William Murphy, Sebastopol, CA (US); Pascal Blais, Ottawa (CA); Jason Phillips, Lower Sackville (CA)

(73) Assignee: IWatchLife Inc., Ottawa, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/722,252

(22) Filed: Oct. 2, 2017

(65) Prior Publication Data

US 2018/0027260 A1   Jan. 25, 2018

Related U.S. Application Data

(63) Continuation of application No. 13/500,711, filed as application No. PCT/CA2010/001607 on Oct. 7, 2010, now Pat. No. 9,788,017.

(60) Provisional application No. 61/249,391, filed on Oct. 7, 2009.

(51) Int. Cl.
*H04N 19/85* (2014.01)
*H04N 21/63* (2011.01)
*H04L 12/64* (2006.01)
*H04N 7/18* (2006.01)
*G08B 17/12* (2006.01)

(52) U.S. Cl.
CPC ......... *H04N 19/85* (2014.11); *H04L 12/6418* (2013.01); *H04N 21/632* (2013.01); *G08B 17/125* (2013.01); *H04N 7/181* (2013.01)

(58) Field of Classification Search
None
See application file for complete search history.

(56) References Cited

U.S. PATENT DOCUMENTS

| | | | |
|---|---|---|---|
| 9,788,017 B2 * | 10/2017 | Laganiere | H04L 12/6418 |
| 2006/0095401 A1 * | 5/2006 | Krikorian | H04N 21/4398 |
| 2007/0168543 A1 * | 7/2007 | Krikorian | G11B 27/034 709/231 |
| 2007/0198532 A1 * | 8/2007 | Krikorian | G06Q 30/0273 705/14.69 |
| 2007/0234213 A1 * | 10/2007 | Krikorian | H04N 21/23406 715/716 |

* cited by examiner

*Primary Examiner* — David N Werner
(74) *Attorney, Agent, or Firm* — The Noblitt Group, PLLC

(57) ABSTRACT

A method for performing video analytics includes receiving at a source end video data including first video data relating to an event of interest. Using video analytics, other than a data compression process, pre-processing of the video data is performed at the source end to reduce the bandwidth requirement for transmitting the video data to below a bandwidth limit of a Wide Area Network (WAN) over which the video data is to be transmitted. The pre-processed video data is transmitted to a central server via the WAN, where other video analytics processing of the pre-processed video data is performed. Based on a result of the other video analytics processing, a signal is generated for performing a predetermined action, in response to an occurrence of the event of interest at the source end.

16 Claims, 5 Drawing Sheets

VIDEO ANALYTICS WITH PRE-PROCESSING AT THE SOURCE END

CROSS-REFERENCES TO RELATED APPLICATIONS

This application is a continuation of U.S. patent application Ser. No. 13/500,711, filed on Apr. 6, 2012, which is a National Stage Entry of International Application No. PCT/CA2010/001607, filed on Oct. 7, 2010, which claims priority to U.S. Provisional Patent Application Ser. No. 61/249,391, filed on Oct. 7, 2009, and incorporates the disclosure of that application in its entirety by reference. To the extent that the present disclosure conflicts with any referenced application, however, the present disclosure is to be given priority.

FIELD OF THE INVENTION

The instant invention relates generally to video analytics. More particularly, the instant invention relates to using video analytics at the source end for pre-processing video data prior to transmitting the video data across a Wide Area Network such as for instance the Internet.

BACKGROUND OF THE INVENTION

Modern security and surveillance systems have come to rely very heavily on the use of video surveillance cameras for the monitoring of remote locations, entry/exit points of buildings or other restricted areas, and high-value assets, etc. The majority of surveillance video cameras that are in use today are analog. Analog video surveillance systems run coaxial cable from closed circuit television (CCTV) cameras to centrally located videotape recorders or hard drives. Increasingly, the resultant video footage is compressed on a digital video recorder (DVR) to save storage space. The use of digital video systems (DVS) is also increasing; in DVS, the analog video is digitized, compressed and packetized in IP, and then streamed to a server.

More recently, IP-networked digital video systems have been implemented. In this type of system the surveillance video is encoded directly on a digital camera, in H.264 or another suitable standard for video compression, and is sent over Ethernet at a bit rate. This transition from analog to digital video is bringing about long-awaited benefits to security and surveillance systems, largely because digital compression allows more video data to be transmitted and stored. Of course, a predictable result of capturing larger amounts of video data is that more personnel are required to review the video that is provided from the video surveillance cameras. Advantageously, storing the video can reduce the amount of video data that is to be reviewed, since the motion vectors and detectors that are used in compression can be used to eliminate those frames with no significant activity. However, since motion vectors and detectors offer no information as to what is occurring, someone still must physically screen the captured video to determine suspicious activity.

The market is currently seeing a migration toward IP-based hardware edge devices with built-in video analytics, such as IP cameras and encoders. Video analytics electronically recognizes the significant features within a series of frames and allows the system to issue alerts or take other actions when specific types of events occur, thereby speeding real-time security response, etc. Automatically searching the captured video for specific content also relieves personnel from tedious hours of reviewing the video, and decreases the number of personnel that is required to screen the video. Furthermore, when 'smart' cameras and encoders process images at the edge, they record or transmit only important events, for example only when someone enters a predefined area that is under surveillance, such as a perimeter along a fence. Accordingly, deploying an edge device is one method to reduce the strain on a network in terms of system requirements and bandwidth.

Unfortunately, deploying 'smart' cameras and encoders at the edge carries a significantly higher cost premium compared to deploying a similar number of basic digital or analog cameras. Furthermore, since the analytics within the cameras is designed into the cameras there is a tradeoff between flexibility and cost, with higher cost solutions providing more flexibility. In essence, to support changing functionality requires a new camera.

Greater flexibility and lower cost may also be achieved when video data is streamed locally to a centralized resource for video analytics processing. International patent publication number WO 2008/092255, which was published on 7 Aug. 2008, discloses a task-based video analytics processing approach in which video data is streamed from IP cameras or video recorders at the edge to shared co-located video analytics resources via a Local Area Network. In particular, a video analytics task manager routes video analytics tasks to a shared video analytics resource in response to a video analytics task request. The shared video analytics resource obtains video data to be analyzed in response to receipt of the video analytics task, and performs requested video analytics on the obtained video data. Since the video data is transmitted via a LAN, which is limited to a relatively small geographic area, it is a relatively simple matter to provide a network between the edge devices and the centralized processing facilities that has sufficient bandwidth to accommodate large amounts of video data. Unfortunately, such a system cannot be expanded easily to include very many additional edge devices since the processing capabilities of the system within the LAN are finite. Similarly, the ability to perform multiple video analytics functions in parallel is limited by the processing capabilities of the system. Simply adding more servers to process the video data from additional edge devices, or to process video data using a plurality of different video analytics engines, is very expensive in terms of capital investment and in terms of the additional ongoing maintenance, support and upgrading that is required.

Accordingly, it would be advantageous to provide a method and system that overcomes at least some of the above-mentioned limitations.

SUMMARY OF EMBODIMENTS OF THE INVENTION

In accordance with an aspect of the invention there is provided a method comprising: receiving at a source end video data including first video data relating to an event of interest captured using a video camera disposed at the source end; using video analytics other than a data compression process, pre-processing the video data at the source end to reduce the bandwidth requirement for transmitting the video data to below a bandwidth limit of a Wide Area Network (WAN) over which the video data is to be transmitted; transmitting the pre-processed video data to a central server via the WAN; performing other video analytics processing of the pre-processed video data at other than the source end; and, based on a result of the other video analytics processing, generating a signal for performing a predetermined action in response to an occurrence of the event of interest at the source end.

In accordance with an aspect of the invention there is provided a method comprising: receiving video data at a source end, the video data including video data relating to an event of interest captured using a video camera disposed at the source end; using video analytics other than a data compression process, pre-processing the video data at the source end such that a first portion of the video data in which the event of interest is detected is formatted differently than a second portion of the video data in which the event of interest is other than detected; transmitting the pre-processed video data from the source end to a central server via a Wide Area Network (WAN); performing other video analytics processing of the pre-processed video data at other than the source end; and, based on a result of the other video analytics, generating a signal for performing a predetermined action in response to an occurrence of the event of interest at the source end.

In accordance with an aspect of the invention there is provided a method receiving video data at a source end, the video data including video data relating to an event of interest captured using a video camera disposed at the source end; performing first video analytics on the video data using a first processor disposed at the source end, the first video analytics for detecting the event of interest in a portion of the video data; in dependence upon detecting the event of interest in the portion of the video data, providing the portion of the video data via a Wide Area Network (WAN) from the source end to a second processor disposed at a central location; and, performing second video analytics processing on the portion of the video data using the second processor, the second video analytics for determining predetermined information relating to the event of interest.

BRIEF DESCRIPTION OF THE DRAWINGS

Exemplary embodiments of the invention will now be described in conjunction with the following drawings, wherein similar reference numerals denote similar elements throughout the several views, in which.

DETAILED DESCRIPTION OF EMBODIMENTS OF THE INVENTION

Figure 1:
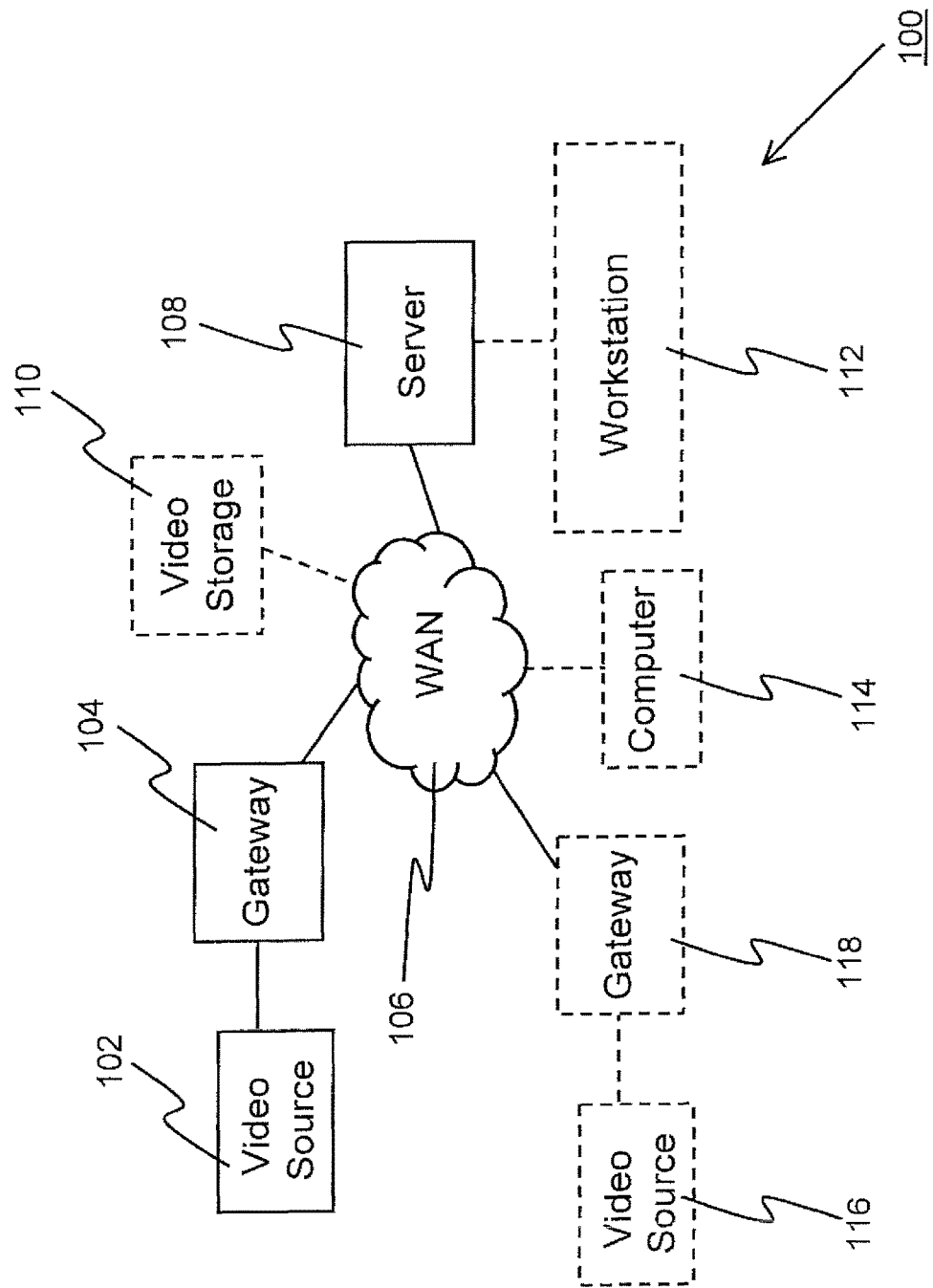
FIG. 1 is a simplified block diagram of a system that is suitable for implementing a method according to an embodiment of the instant invention.

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed, but is to be accorded the widest scope consistent with the principles and features disclosed herein.

Throughout the description of the embodiments of the instant invention, and in the appended claims, the following definitions are to be accorded to the following terms:

Video analytics is defined as any technology used to analyze video for specific data, behavior, objects or attitude. Typically, video analytics includes both video content analysis and inference processing. Some specific and non-limiting examples of video analytics applications include: counting the number of pedestrians entering a door or a geographic region; determining the location, speed and direction of travel; identifying suspicious movement of people or assets; license plate identification; and evaluating how long a package has been left in an area.

A data compression process is defined as encoding information using fewer bits than an unencoded representation would use, through the use of specific encoding schemes. Video data that are encoded at a source end using a data compression process are useful only after being decoded subsequently at a destination end. Some non-limiting examples of data compression processes for video data include MPEG-4 and H.264. Data compression processes do not rely upon detecting an event of interest in the video data.

Pre-processing is defined as using video analytics to detect an event of interest in video data prior to transmitting the video data from a source end to a destination end via a Wide Area Network (WAN). Some non-limiting examples of a WAN include: a computer network such as the Internet of the World Wide Web; a cellular telephone network, a Wi-Fi network, a satellite communication network, etc. Pre-processing further includes at least one of: i) formatting differently a first portion of the video data in which the event of interest is detected compared to a second other portion of the video data in which the event of interest is other than detected; and, ii) reducing the bandwidth requirement for transmitting the video data. In at least one embodiment, pre-processing reduces directly the bandwidth requirement for transmitting the video data below a bandwidth limit of a network over which the video data is to be transmitted. Some non-limiting examples of pre-processing include: cropping regions of the video data that relate to other than the event of interest; blanking out or varying a color depth of portions of the video data that relate to other than the event of interest; providing portions of the video data that relate to other than the event of interest at a lower resolution than is used for portions of the video data that relate to the event of interest; and, providing portions of the video data that relate to other than the event of interest at a lower frame rate than is used for portions of the video data that relate to the event of interest.

As discussed supra with reference to WO 2008/092255, the limited processing resources that are available within a LAN prevents the expansion of video analytics monitoring systems beyond a certain, relatively small number of edge devices. In general, a system operating over a LAN is designed to work with a known number of edge devices, such as IP network cameras, which stream video data to a local processing resource via a fiber optic network or another high bandwidth communication medium. Some room for expansion may be designed into the system by providing more processing capability than is needed initially, but this approach increases the initial cost and the amount of expansion that is supported is still limited. Furthermore, every client is required to deploy, operate and maintain a separate system, including edge devices, LAN and processing resources.

An alternative approach contemplates moving the processing infrastructure away from the client's local network and "into the cloud." Cloud computing is a general term for anything that involves delivering hosted services over the Internet. A cloud service has three distinct characteristics that differentiate it from traditional hosting: it is sold on demand, typically by the minute or the hour; it is elastic, a user can have as much or as little of a service as they want at any given time; and the service is fully managed by the provider, the client needs nothing but a terminal with Internet access. Examples of terminals include mobile phones, personal computers, IP TVs, etc. Moving the video analytics processing into the cloud may reduce a client's initial capital expenditure, avoid the need for the client to maintain a local server farm, while at the same time providing available additional processing capability to support significant expansion and flexibility of a client's video analytics monitoring system. Furthermore, cloud computing as applied to video analytics supports parallel processing with multiple different video analytics engines and/or hierarchal processing with different video analytics engines. In addition, some video analytics processing may be "farmed out" to third parties if specialized video analytics engines are required.

In many instances, modern IP network video cameras support high definition video formats that result in very large amounts of video data being captured. Even the amount of video data that is captured by VGA cameras can be significant in a monitoring system of moderate size. Unfortunately, the bandwidth that is available across a WAN such as the Internet is limited and cannot be increased easily. A major obstacle to the adoption of cloud computing for video analytics has been the inability to transmit the video data across the WAN to the centralized video analytics processing resources, due to the limited bandwidth of the WAN. In the description that follows, methods and systems are described in which pre-processing of video data using video analytics at the source end is performed to reduce the amount of video data being sent to the centralized video analytics processing resources via the WAN. According to at least some of the described embodiments, the pre-processed video data is enhanced to be more useful when subsequent video analytics processing is performed "in the cloud."

Referring now to FIG. 1, shown is a schematic block diagram of a system that is suitable for implementing a method according to an embodiment of the instant invention. The system 100 includes a video source 102, which is deployed at a source end for monitoring a known field of view (FOV). For example, the video source 102 monitors one of a parking lot, an entry/exit point of a building, and an automated teller machine (ATM). By way of a specific and non-limiting example, the video source 102 is a network IP camera with onboard video analytics capabilities, such as for instance an AXIS 211M Network Camera or another similar device. Alternatively, the video source 102 is a "dumb" IP camera or an analogue video camera, coupled with a not illustrated video encoder and/or a local video analytics engine. The video source 102 is in communication with a central server 108 via gateway 104 and Wide Area Network (WAN) 106, such as for instance the Internet of the World Wide Web. In the system that is shown in FIG. 1, central server 108 comprises one or more processors for performing video analytics processing of video data that is provided from the video source 102 via WAN 106.

Optionally, the system 100 includes a video storage device 110. By way of a specific and non-limiting example, the video storage device 110 is one of a digital video recorder (DVR), a network video recorder (NVR), or a storage device in a box with a searchable file structure. Optionally, the video storage device 110 is local to the source end. Optionally, the video storage device 110 is local to the central server 108.

The system 100 optionally includes a workstation 112, including a not illustrated processor portion, a display device and an input device. The optional workstation 112 is in communication with server 108 for supporting end-user control and video review functions. Alternatively, the server 108 and the optional workstation 112 are combined, comprising for instance a personal computer including a display and an input device. Optionally, a computer 114 is provided in communication with the WAN 106 for supporting remote access of the video data that is provided by the video source 102. For instance, a user uses a web browser application that is in execution on computer 114 for monitoring portions of the video data that are provided by the video source 102. Optionally, the computer 114 is a personal computer located at the source end, or virtually anywhere else in the world. Alternatively, the computer 114 is a mobile electronic device, such as for instance one of a cell phone, a smart phone, a PDA, or a laptop computer, etc.

Optionally, the video source 102 connects to WAN 106 without the gateway 104. Optionally more than one video source is provided in communication with the central server 108. For instance, a second video source 116 optionally is provided in communication with central server 108 via optional gateway 118 and WAN 106. Optionally, the second video source 116 is the same type as video source 102. Alternatively the second video source 116 is a different type than video source 102. Optionally, the first video source 102 is associated with a first client and the second video source 116 is associated with a second client. Accordingly, plural video sources associated with more than one client are able to transmit video data over WAN 106 to a shared central processing facility, e.g. central server 108, which is capable of performing different video analytics processing according to the individual needs of each client. Further optionally, the video source 102 and/or 116 comprises a plurality of separate video sources disposed at the source end and connected to gateway 104 or 118 via a not illustrated router. In this latter case, the plurality of separate video sources optionally includes video sources that are all of the same type, or that are of mixed types.

Figure 2:
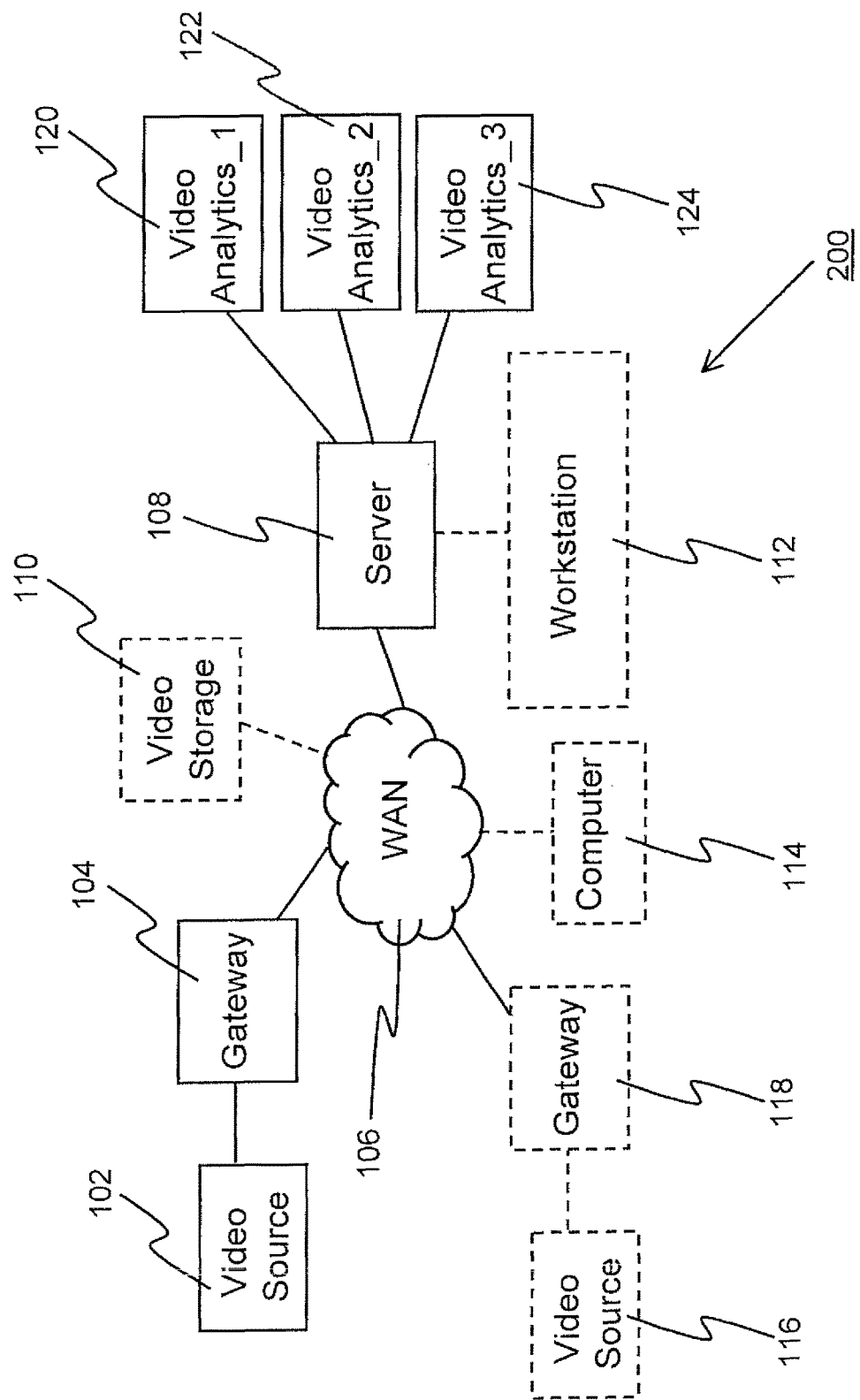
FIG. 2 is a simplified block diagram of a system that is suitable for implementing a method according to an embodiment of the instant invention.

Referring now to FIG. 2, shown is a schematic block diagram of another system that is suitable for implementing a method according to an embodiment of the instant invention. The system 200 includes a video source 102, which is deployed at a source end for monitoring a known field of view (FOV). For example, the video source 102 monitors one of a parking lot, an entry/exit point of a building, and an automated teller machine (ATM). By way of a specific and non-limiting example, the video source 102 is a network IP camera with onboard video analytics capabilities, such as for instance an AXIS 211M Network Camera or another similar device. Alternatively, the video source 102 is a "dumb" IP camera or an analogue video camera, coupled with a not illustrated video encoder and/or a local video analytics engine. Video source 102 is in communication with a central server 108 via gateway 104 and Wide Area Network (WAN) 106, such as for instance the Internet of the World Wide Web. Central server 108 is further in communication with a plurality of video analytics engines 120-124, which are indicated in FIG. 2 as Video Analytics_1 120, Video Analytics_2 122 and Video Analytics_3 124. In the example that is illustrated in FIG. 2, the central server 108 provides the video data to the plurality of video analytics engines 120-

124 over a Local Area Network (LAN). Alternatively, the central server 108 provides the video data to the plurality of video analytics engines 120-124 over one or more of: a WAN; a wireless communication channel such as a cellular telephone network, Bluetooth, a Wi-Fi network, etc.; or a direct connection such as a fiber optic cable or coaxial cable, etc.

Referring still to FIG. 2, each of the different video analytics engines 120-124 performs a different video analytics function. By way of a specific and non-limiting example, Video Analytics_1 120 detects a vehicle within a data frame, Video Analytics_2 122 detects the vehicle license plate within a data frame, and Video Analytics_3 124 reads the license plate characters. By way of another specific and non-limiting example, Video Analytics_1 120 determines a number of people within a data frame, Video Analytics_2 122 detects loitering behavior within a data frame, and Video Analytics_3 124 performs facial recognition. As will be apparent to one of skill in the art, different monitoring or surveillance applications require different video analytics engines and/or a different number of video analytics engines. Optionally, some or all of the video analytics engines 120-124 are fee-per-use-based or subscription based.

Optionally, the system 200 includes a video storage device 110. By way of a specific and non-limiting example, the video storage device 110 is one of a digital video recorder (DVR), a network video recorder (NVR), or a storage device in box with a searchable file structure. Optionally, the video storage device 110 is local to the source end. Optionally, the video storage device 110 is local to the central server 108.

The system 200 optionally includes a workstation 112, including a not illustrated processor portion, a display device and an input device, which is in communication with server 108 for supporting end-user control and video review functions. Alternatively, the server 108 and the workstation 112 are combined, comprising for instance a personal computer including a display and an input device. Optionally, a computer 114 is provided in communication with the WAN 106 for supporting remote access of the video data that is provided by the video source 102. For instance, a user uses a web browser application that is in execution on computer 114 for monitoring portions of the video data that are provided by the video source 102. Optionally, the computer 114 is a personal computer located at the source end or virtually anywhere else in the world. Alternatively, the computer 114 is a mobile electronic device, such as for instance one of a cell phone, a smart phone, a PDA, or a laptop computer.

Optionally, the video source 102 connects to WAN 106 without the gateway 104. Optionally more than one video source is provided in communication with the central server 108. For instance, a second video source 116 optionally is provided in communication with central server 108 via optional gateway 118 and Wide Area Network (WAN) 106. Optionally, the second video source 116 is the same type as video source 102. Alternatively the second video source 116 is a different type than video source 102. Optionally, the first video source 102 is associated with a first client and the second video source 116 is associated with a second client. Accordingly, plural video sources associated with more than one client are able to transmit video data over WAN 106 to a shared central processing facility, e.g. central server 108, which is capable of performing different video analytics processing according to the individual needs of each client. Further optionally, the video source 102 and/or 116 comprises a plurality of separate video sources disposed at the source end and connected to gateway 104 or 118 via a not illustrated router. In this latter case, the plurality of separate video sources optionally includes video sources that are all of the same type, or that are of mixed types.

Figure 3:
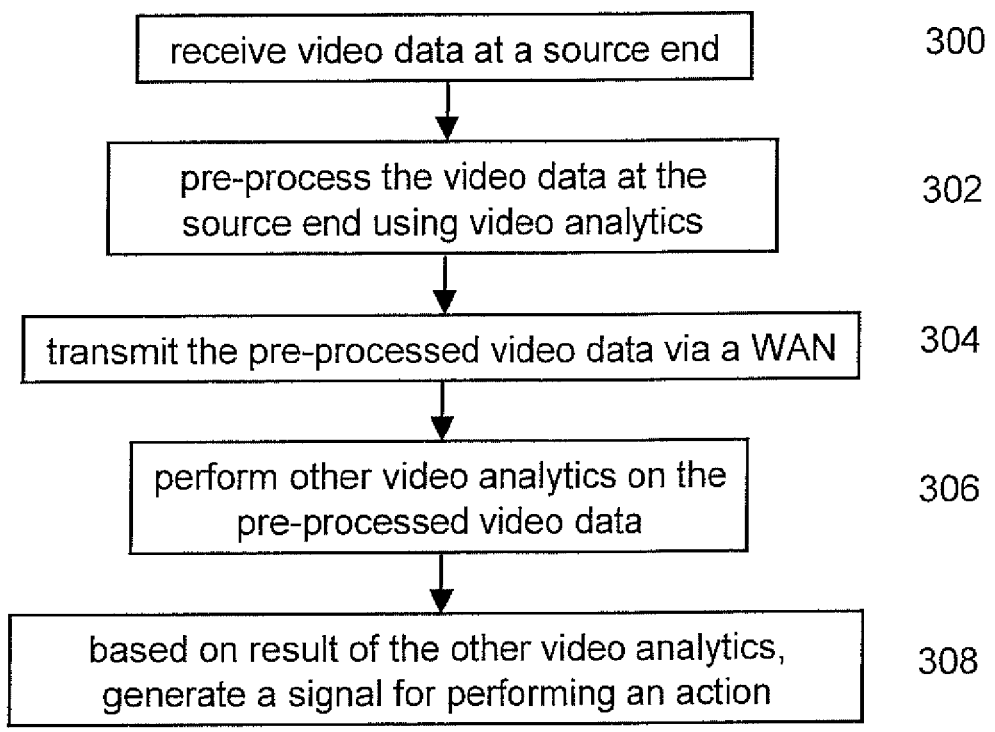
FIG. 3 is a simplified flow diagram of a method according to an embodiment of the instant invention.

A method according to an embodiment of the instant invention is described with reference to the simplified flow diagram shown in FIG. 3, and with reference to the systems shown in FIG. 1 and FIG. 2. At 300 video data is received at a source end, the video data including video data relating to an event of interest captured using a video camera disposed at the source end. For instance, the video camera captures video data at a known frame rate, typically 30 FPS. At 302 the video data is pre-processed at the source end using video analytics other than a compression algorithm. In particular, the pre-processing reduces the bandwidth requirement for transmitting the video data by an amount that is sufficient to result in a data stream that requires an amount of bandwidth below a bandwidth limit of WAN 106. When the pre-processed video data is also compressed prior to being transmitted via the WAN 106, then the reduction of the bandwidth requirement for transmitting the video data is described as a combination of a first reduction due to pre-processing using other than a compression algorithm and a second reduction due to the subsequent compression of the pre-processed video data using a suitable compression standard such as for instance MPEG-4 or H.264. Alternatively, when the pre-processed video data is not compressed prior to being transmitted via the WAN 106, then the reduction of the bandwidth requirement for transmitting the video data is due entirely to pre-processing using other than a compression algorithm. In both cases, transmission of the pre-processed video data does not result in a bandwidth limit of the WAN being exceeded.

At 304 the pre-processed video data is transmitted from the video source 102 to the central server 108 via the WAN 106, without exceeding the bandwidth limit of the WAN 106. At 306 the pre-processed video data is subjected to additional video analytics processing. Referring now to the system shown in FIG. 1, the additional video analytics processing is performed using a not illustrated processor of central server 108. Optionally, the central server 108 has access to a plurality of different video analytics engines, which may be selected individually for performing the additional video analytics processing of the pre-processed video data. Alternatively, the central server 108 comprises a plurality of separate processors, each processor capable of performing different video analytics processing of the pre-processed video data. Referring now to the system shown in FIG. 2, the additional video analytics processing is performed using at least one of the video analytics engines 120-124. By way of a specific and non-limiting example, the central server 108 accesses a database containing information that specifies to which video analytics engine the pre-processed data originating from a particular source is to be sent. Alternatively, the central server 108 performs video analytics on the pre-processed video data and then provides the pre-processed video data to one of the video analytics engines 120-124 in dependence upon a result of the video analytics. At 308, based on a result of the additional video analytics, a signal is generated for performing a predetermined action in response to an occurrence of the event of interest at the source end.

Several non-limiting examples of a predetermined action include: generating an alert; forwarding at least a portion of the video data for review by a human operator; storing at least a portion of the video data; and, providing at least a portion of the video data to another video analytics engine for further processing. Further optionally, the predetermined action comprises a control signal for controlling a system. For example, a doorbell is controlled in dependence upon recognizing a person standing at the door. Alternatively, a control signal is provided to an alarm system such that the alarm is sounded upon detecting a security risk or emergency situation. Further alternatively, the control signal is one of many signals that are grouped for controlling a more complex decision making process. For example, the video analytics determines a likelihood of a fire and based on its result and the result of other sensors such as a temperature sensor, a CO detector, and a smoke detector. Optionally, the alert is a human intelligible alert provided to an indicated user. Optionally, the alert is provided via a wireless communications channel to a portable electronic device associated with the indicated user. Further optionally, providing the alert comprises providing at least a portion of the video data relating to the event of interest, for being displayed to the indicated user. Additionally, the predetermined action may include billing for usage of a fee-based video analytics engine.

Optionally, the video source 102 inserts into the transmission of the pre-processed video data at least a pre-processing result, other than the video data itself, relating to a result of pre-processing the video data. Optionally, the central server 108 selects a suitable video analytics engine for further processing the pre-processed video data based on the at least a pre-processing result. By way of a specific and non-limiting example, the video source 102 pre-processes the video data using a video analytics engine for detecting an event of interest comprising the location, speed and direction of a vehicle in the video data. The video source 102 then provides pre-processed video data including at least a pre-processing result in the form of metadata describing the event of interest that was detected using video analytics. Alternatively, the metadata specifies a particular video analytics engine to be used to perform additional video analytics processing of the pre-processed data. The pre-processed video data is then transmitted via WAN 106 to the central server 108. The central server 108 interprets the metadata, and based thereon a video analytics engine is selected for performing the additional video analytics processing of the pre-processed data.

Figure 4:
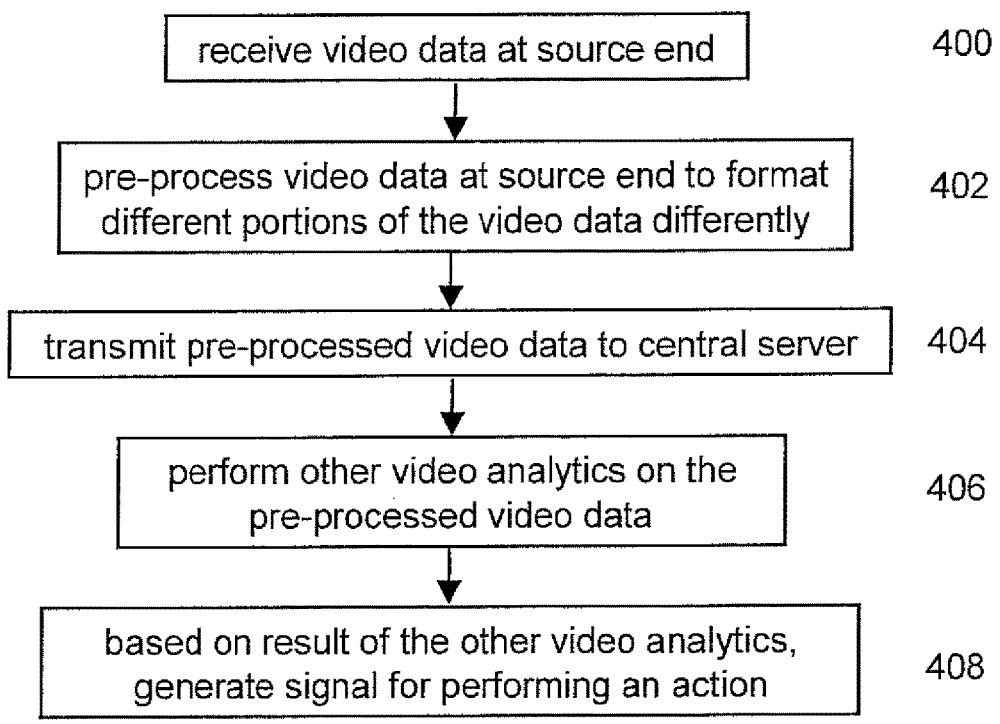
FIG. 4 is a simplified flow diagram of a method according to an embodiment of the instant invention; and, FIG. 5 is a simplified flow diagram of a method according to an embodiment of the instant invention.

A method according to another embodiment of the instant invention is described with reference to the simplified flow diagram shown in FIG. 4, and with reference to the systems shown in FIG. 1 and in FIG. 2. At 400 video data is received at a source end, the video data including video data relating to an event of interest captured using a video camera disposed at the source end. For instance, the video camera captures video data at a known frame rate, typically 30 FPS. At 402 the video data is pre-processed at the source end using video analytics other than a compression algorithm. In particular, video analytics is used to detect a predetermined event of interest in the video data. The video data is pre-processed such that a first portion of the video data in which the event of interest is detected is formatted differently than a second portion of the video data in which the event of interest is other than detected. In general, the effect of pre-processing is to reduce the data size of the first portion of the video data by an amount that is sufficient to result in a video data stream, including the first portion of the video data and the second portion of the video data, that requires an amount of bandwidth below a bandwidth limit of WAN 106. By way of some specific and non-limiting examples, frames that do not contain the event of interest are formatted at a lower resolution than frames that contain the event of interest, or background regions in a frame are provided at lower resolution than foreground regions relating to the event of interest in the same frame, wherein foreground is typically defined as a region wherein the event of interest is discernible or wherein further processing is to be performed. At 404 the pre-processed video data is transmitted to central server 108 via WAN 106. At 406 the pre-processed video data is subjected to additional video analytics processing. Referring to the system shown in FIG. 1, the additional video analytics processing is performed using a not illustrated processor of central server 108. Optionally, the central server 108 has access to a plurality of different video analytics engines, which may be selected individually for performing the additional video analytics processing of the pre-processed video data. Alternatively, the central server 108 comprises a plurality of separate processors, each processor capable of performing different video analytics processing of the pre-processed video data. Referring to the system shown in FIG. 2, the additional video analytics processing is performed using at least one of the video analytics engines 120-124. By way of a specific and non-limiting example, the central server 108 accesses a database containing information that specifies to which video analytics engine the pre-processed data originating from a particular source is to be sent. Alternatively, the central server 108 performs video analytics on the pre-processed video data and then provides the pre-processed video data to one of the video analytics engines 120-124 in dependence upon a result of the video analytics. Further alternatively, the central server 108 performs video analytics on the pre-processed video data and then provides the pre-processed video data to one of the video analytics engines 120-124 in dependence upon a result of the video analytics and previously stored data. At 408, based on a result of the additional video analytics, a signal is generated for performing a predetermined action in response to an occurrence of the event of interest at the source end.

Several non-limiting examples of a predetermined action include: generating an alert; forwarding at least a portion of the video data for review by a human operator; storing at least a portion of the video data; and, providing at least a portion of the video data to another video analytics engine for further processing. Further optionally, the predetermined action comprises a control signal for controlling a system. For example, a doorbell is controlled in dependence upon recognizing a person standing at the door. Alternatively, a control signal is provided to an alarm system such that the alarm is sounded upon detecting a security risk or emergency situation. Further alternatively, the control signal is one of many signals that are grouped for controlling a more complex decision making process. For example, the video analytics determines a likelihood of a fire and based on its result and the result of other sensors such as a temperature sensor, a CO detector, and a smoke detector. Optionally, the alert is a human intelligible alert provided to an indicated user. Optionally, the alert is provided via a wireless communications channel to a portable electronic device associated with the indicated user. Further optionally, providing the alert comprises providing at least a portion of the video data relating to the event of interest, for being displayed to the indicated user. Additionally, the predetermined action may include billing for usage of a fee-based video analytics engine.

Figure 5:
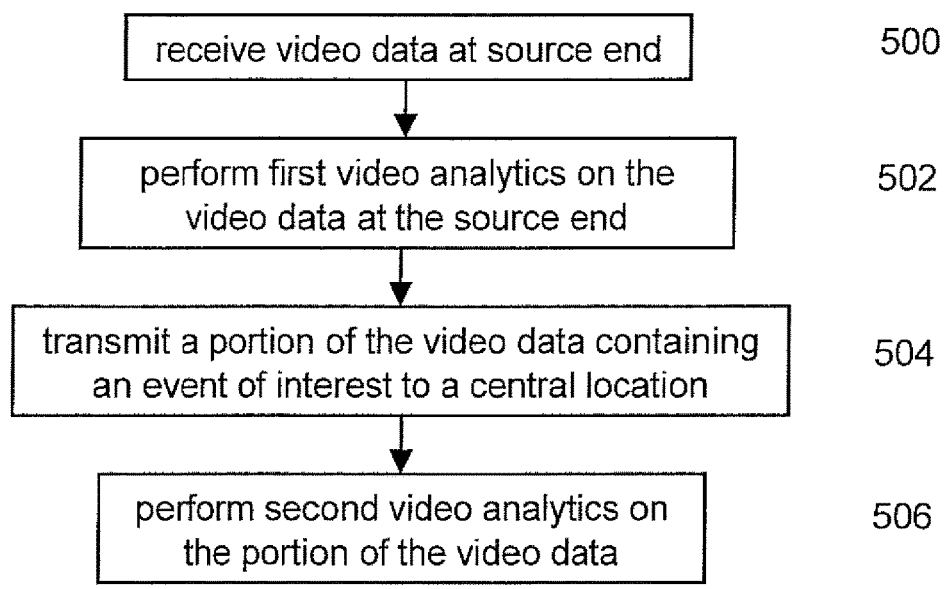

A method according to another embodiment of the instant invention is described with reference to the simplified flow diagram shown in FIG. 5, and with reference to the systems shown in FIG. 1 and in FIG. 2. At 500 video data is received at a source end, the video data including video data relating to an event of interest captured using a video camera disposed at the source end. For instance, the video camera captures video data at a known frame rate, typically 30 FPS. At 502 first video analytics is performed on the video data using a first processor disposed at the source end, the first video analytics for detecting the event of interest in a portion of the video data. At 504, in dependence upon detecting the event of interest in the portion of the video data, the portion of the video data is provided via WAN 106 to a second processor disposed at a central location. In particular, a bandwidth of the portion of the video data is less than a bandwidth limit of the WAN 106 across which the video data is transmitted. At 506 second video analytics is performed on the portion of the video data using the second processor at the central location, the second video analytics for determining information relating to the event of interest, the determination performed in a predetermined fashion.

By way of a specific and non-limiting example, the first video analytics locates a vehicle license plate within video data captured using a video camera that monitors a parking lot entrance. Optionally, a predetermined number of frames of the video data, such as for instance one frame, is transmitted to the central location via WAN 106, where second video analytics is performed for determining the license plate number. Optionally, an area of each frame outside of a region that contains the identified license plate is cropped, such that only the region of video data that contains the identified license plate is transmitted to the central location via WAN 106, where second video analytics is performed for determining the license plate number. Optionally, the first video analytics selects a frame with a suitable license plate image. Thus bandwidth is reduced since only one or a few frames having a suitable quality relative to the other frames is transmitted. Optionally, the frames are all stored local to the source until the second video analytics is successfully completed. Upon completion of the second video analytics, the frames are discarded. Alternatively, upon completion some or all of the frames are stored in non-volatile memory. Further alternatively, when the second analytics is completed unsuccessfully, more frames are provided from the local storage to the central location via the WAN 106 for second video analytics. Upon successful completion, the frame or frames needed to extract the license plate are known and are optionally stored for later retrieval. For example, the necessary frames and the result are stored in association one with another as evidence and conclusion.

Numerous other embodiments may be envisaged without departing from the scope of the invention.

What is claimed is:

1. A method comprising:
   receiving video data at a source end, the video data including video data relating to an event of interest captured using a video camera disposed at the source end;
   pre-processing the video data comprising performing first video analytics on the video data using a first processor disposed at the source end, the first video analytics for detecting the event of interest in a portion of the video data;
   in dependence upon detecting the event of interest in the portion of the video data, transmitting pre-processed video data comprising the portion of the video data, via a Wide Area Network (WAN), from the source end to a second processor connected to the WAN;
   transmitting with the portion of the video data at least a pre-processing result other than the pre-processed video data itself;
   using the second processor, interpreting the pre-processing result and selecting second video analytics processing based on a result of the interpreting; and
   performing the second video analytics processing on the portion of the video data, the second video analytics for determining predetermined information relating to the event of interest.

2. A method according to claim 1, wherein transmitting the at least a pre-processing result comprises inserting metadata into the transmission of the portion of the video data.

3. A method according to claim 2, wherein the metadata is descriptive of a type of the event of interest detected during the pre-processing.

4. A method according to claim 2, wherein the metadata specifies a particular video analytics engine to be used to perform additional video analytics processing of the pre-processed video data.

5. A method according to claim 1, wherein the second video analytics processing selected by the second processor is fee-per-use-based or subscription based.

6. A method according to claim 1, wherein a bandwidth requirement for transmitting the portion of the video data is less than a bandwidth requirement for transmitting the received video data absent pre-processing thereof.

7. A method according to claim 1, comprising providing a real-time indication of the results of the second video analytics processing.

8. A method according to claim 1, comprising providing the results of the second video analytics processing to another video analytics engine.

9. A method according to claim 1, comprising generating a signal for performing a predetermined action in response to the second video analytics determining the predetermined information relating to the event of interest.

10. A method according to claim 9, wherein the signal is for generating an alert.

11. A method according to claim 10, wherein the alert is a human intelligible alert provided to an indicated user.

12. A method according to claim 9, wherein the alert is provided via a wireless communications channel to a portable electronic device associated with the indicated user.

13. A method according to claim 9, wherein the signal is for forwarding at least a portion of the video data for review by a human operator.

14. A method according to claim 9, wherein the signal is for storing at least a portion of the video data.

15. A method according to claim 9, wherein the signal is for providing at least a portion of the video data to another video analytics engine for further processing.

16. A method according to claim 9, wherein the signal is for billing for usage of a fee-based video analytics engine.

* * * * *